United States Patent
Kriehn et al.

(10) Patent No.: US 6,758,660 B2
(45) Date of Patent: Jul. 6, 2004

(54) SCREW VACUUM PUMP WITH A COOLANT CIRCUIT

(75) Inventors: Hartmut Kriehn, Köln (DE); Lothar Brenner, Bad Münstereifel (DE)

(73) Assignee: Leybold Vakuum GmbH, Cologne (DE)

( * ) Notice: Subject to any disclaimer, the term of this patent is extended or adjusted under 35 U.S.C. 154(b) by 0 days.

(21) Appl. No.: 10/169,270

(22) PCT Filed: Dec. 9, 2000

(86) PCT No.: PCT/EP00/12471

§ 371 (c)(1),
(2), (4) Date: Sep. 30, 2002

(87) PCT Pub. No.: WO01/48385

PCT Pub. Date: Jul. 5, 2001

(65) Prior Publication Data

US 2003/0147764 A1 Aug. 7, 2003

(30) Foreign Application Priority Data

Dec. 27, 1999 (DE) .......................... 199 63 172

(51) Int. Cl.⁷ ...................... F04C 18/16; F04C 29/04
(52) U.S. Cl. ...................... 418/91; 418/88; 418/94; 418/201.1
(58) Field of Search .................... 418/88, 91, 94, 418/201.1

(56) References Cited

U.S. PATENT DOCUMENTS

| 2,938,664 A | * | 5/1960 | Noller | .................. 418/85 |
|---|---|---|---|---|
| 4,917,583 A | | 4/1990 | Frings et al. | ................ 418/206 |
| 4,983,107 A | | 1/1991 | Steffens et al. | ................ 418/9 |
| 5,924,855 A | | 7/1999 | Dahmlos et al. | .............. 418/91 |
| 6,045,343 A | * | 4/2000 | Liou | ........................... 418/91 |

FOREIGN PATENT DOCUMENTS

| DE | 19745616 | 4/1999 | |
|---|---|---|---|
| DE | 19748385 | 5/1999 | |
| DE | 19800825 | 7/1999 | |
| DE | 19820523 | 11/1999 | |
| EP | 0290663 | 11/1988 | |
| FR | 1290239 | 3/1962 | |
| GB | 464493 | 4/1937 | |
| RU | 953268 | * 8/1982 | .................. 418/94 |
| WO | WO 99/19630 | 4/1999 | |
| WO | WO 99/42729 | 8/1999 | |

* cited by examiner

Primary Examiner—John J. Vrablik
(74) Attorney, Agent, or Firm—Fay, Sharpe, Fagan, Minnich & McKee, LLP

(57) ABSTRACT

A screw vacuum pump (1) has shafts (7, 8) and rotors (3, 4) secured to the shafts. Each rotor has a central hollow chamber (31) which receives the shaft or contains in built-in components rotating along with the rotor to define a relatively thin annular slot segment (32) for cross-flow circulation of coolant. The annular slot segment is disposed between the built-in components and an inner wall of the rotor's hollow chamber and between a suction side and a delivery side of the rotor. Separate feed and discharge lines (41, 55, 63, 77, 78, 81, 89, 99, 101, 103) circulate the coolant through the annular slot segment in such a way that the coolant remains cavitation-free and bubble-free.

23 Claims, 5 Drawing Sheets

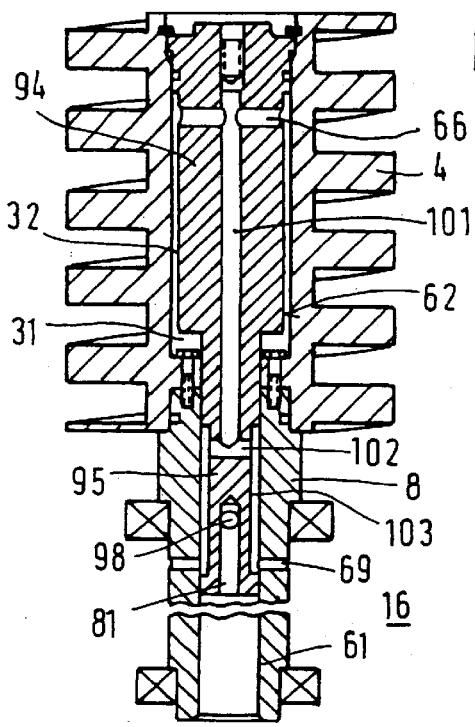
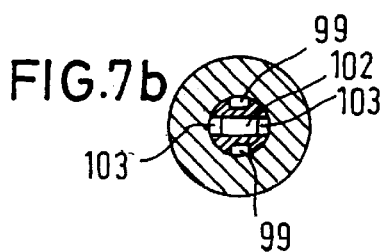
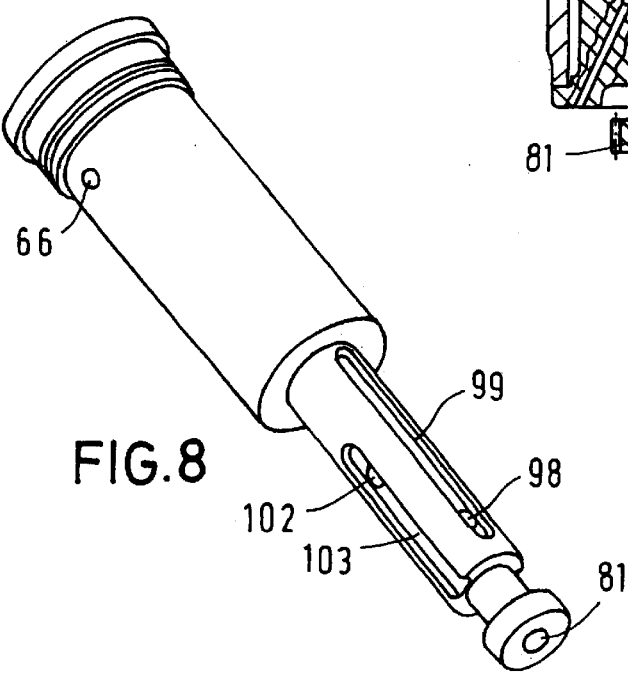
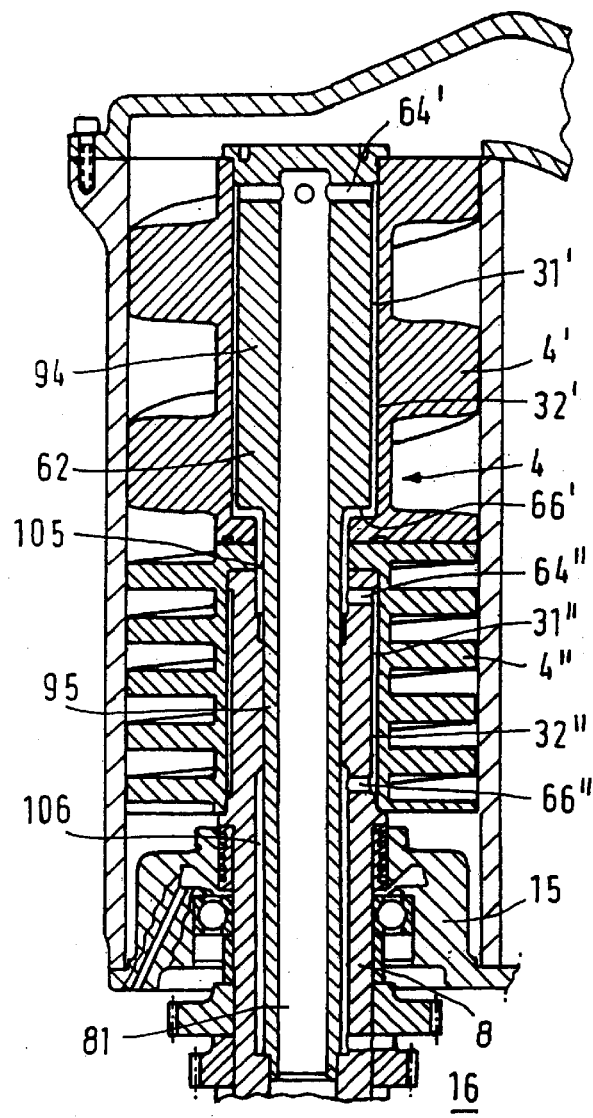

SCREW VACUUM PUMP WITH A COOLANT CIRCUIT

BACKGROUND OF THE INVENTION

The present invention relates to a screw vacuum pump comprising two shafts and two rotors secured to the shafts, whereby each rotor has a central hollow chamber provided with devices for guiding a coolant flow.

Screw vacuum pumps of this kind are known from the German patent applications 197 45 616, 197 48 385 and 198 00 825. Since these are operated in a dry manner (without coolant or lubricant in the pump chamber), there exists the problem of dissipating the heat produced during operation caused chiefly by compressing the pumped gases.

In the instance of the screw vacuum pump known from DE-A-197 45 616 with a cantilevered rotor, both rotor and shaft are equipped with a pocket hole which is open towards the bearing side. A central coolant pipe affixed to the casing extends into the pocket hole, said coolant pipe being guided out of the bore on the side of the bearing and opening out on the rotor side just in front of the end of the pocket hole. With the aid of a coolant pump, the coolant is pumped through the central pipe into the bore. It flows back via the annular chamber between the stationary coolant pipe and the rotating inner wall of the pocket hole. The diameter of the bore in both the rotor and the shaft is relatively small so that the surfaces over which the coolant flows are also small. Moreover, shearing forces occur between the pipe fixed to the housing and the rotating wall of the hollow chamber, producing in the coolant unwanted friction and thus an increase in the temperature. The effectiveness of the desired cooling facility for the rotors is limited for these reasons.

In DE-A-197 48 385 two cooling methods are disclosed. In the instance of a first solution each of the rotors is equipped with a hollow chamber open on one side, into which the coolant is injected. Owing to the rotation, a film forms on the inside of the rotor said film flowing back to the opening of the hollow chamber. In the instance of a film cooling arrangement of this kind there exists the danger of the film breaking down so that the desired cooling effect is interrupted. In addition, it is proposed to equip the hollow chamber in the rotor with conical sections so as to be able to increase the dwell time of the coolant in the hollow chamber of the rotor and thus also influence the amount of heat dissipated. In the instance of such conical sections which support pumping of the flow, however, there all the more exists the danger of the coolant flow breaking down. Finally film cooling arrangements have the general disadvantage, that a stationary flow profile forms, in which that part of the film which is close to the wall flows much more slowly compared to the section of the film further away from the wall. The area close to the wall thus practically forms an isolating layer hampering heat dissipation. For the purpose of removing this disadvantage it has already been proposed to provide obstructions in the flow so that the stationary flow profile is interrupted by turbulence. Thus an exchange of heat can be attained between the film sections close to the wall and those further away from the wall. However, installing obstructions is involved and in all slows down the velocity of the coolant flow.

DE-A-198 20 523 discloses a cooling system similar to the one detailed above. Cooled oil is injected into a hollow section of the shaft. Due to centrifugal forces the oil is displaced outwards to the inner wall of the hollow chamber extending conically in the direction of the discharge side.

In a further embodiment disclosed in DE-A-197 48 385, the coolant flows through an annular slot between rotor shaft and a bearing base extending into the rotor's hollow chamber. As to cooling of the rotor itself, a coolant flow of this kind has very little effect.

DE 198 00 825 discloses a screw pump with entirely hollow rotors. Coolant/lubricant is continuously supplied to, respectively discharged from the hollow chambers. As to the bearings which are arranged on the side where the coolant is discharged, a kinematic reversal has been implemented, i.e., they have a stationary inner ring and a rotating outer ring. The hollow chambers may be designed to be cone-shaped (widening in the direction of the flow) or may have an inner pumping thread. In the instance of such a screw pump there forms a coolant film which requires high rotational or circumferential velocities. The already mentioned danger of the coolant film breaking down exists. Monitoring facilities for an even spread of the coolant quantity to both rotors is, for this reason, absolutely recommended. Also, the necessity detailed of producing turbulence in the film exists, in order to attain an effective cooling effect. Finally equipping a rotor with a conical hollow chamber has several disadvantages: the conical hollow chamber is difficult to manufacture. In the instance of a cantilevered rotor on the delivery side and feeding in the coolant on the suction side of the rotor, the mass of the rotor in the area distant from the bearing is large. Correspondingly, when employing a cantilevered rotor on the delivery side the design needs to be involved. Finally, the fact that the coolant needs to be discharged relatively far out on the delivery side (at a great radial distance), limits the design options available.

DE-A-198 00 825 discloses a further embodiment, in which the rotors are each cantilevered on a shaft stub which extends into a hollow chamber in the rotor, said chamber being only open on the bearing side. The disadvantages detailed above also apply to this embodiment.

In the instance of all cooling systems detailed, there exists in addition the disadvantage that cooling is not performed in a counterflow. The coolant is in each instance supplied to the suction side of the rotor and not to the delivery side which is exposed to a significantly greater extent to the heat produced within the pump.

It is the task of the present invention to equip a pump of the aforementioned kind with an effective cooling arrangement permitting the pump to be manufactured in a simple, compact and cost-effective manner.

SUMMARY OF THE INVENTION

This task is solved through the characterising features of the patent claims.

It has been found that the cooling arrangement in accordance with the present invention in which the coolant flows through a relatively narrow, preferably cylindrical slot in the rotating system at sufficient velocity, has an unexpectedly good cooling effect, particularly since the annular slot can be arranged far to the outside, i.e. in the immediate vicinity of the root circle of the rotor's profile. Since the coolant is not injected, any hollow cavities which might interrupt the cooling effect are not present. Finally there exists the advantage that the direction for the coolant flow may be selected freely so that there is no obstacle as to cooling by way of a counterflow. This results in an equalisation of the temperature spread so that on the delivery side and the suction side narrow rotor/casing slots can be maintained.

As to the selection for the thickness of the annular slot it is relatively narrow, 0.2 to 5 mm for example, preferably 0.5 to 2 mm, whereby the thickness of the slot also depends on the coolant employed, the oil commonly used in vacuum pumps, for example. Apparently it is important that the distance between the two boundary films close to the walls be relatively small so that they will mutually influence each other in a turbulent manner. A laminar flow not influenced by the boundary layers keeping these separated and impairing the transfer of heat is apparently not present or is of negligible thickness.

In order to effectively cool the rotors, the velocity of the coolant (again depending on the type of coolant employed) must be sufficiently high. Flow velocities in the order of 0.1 to 1 m/s, preferably 0.3 to 0.7 m/s have been found to be expedient in the instance of cooling oil. With the known oil supply pumps, be they centrifugal, gear or similar pumps, the required pressure differences can be generated.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIGS. 7a, 7b and 8 illustrate an alternate embodiment in which a component is disposed in a hollow chamber of the rotor independent of shaft limits on the cooling slot;

FIG. 9 is an alternate embodiment with a two section rotor.

DETAILED DESCRIPTION OF THE PREFERRED EMBODIMENTS

Figure 1:
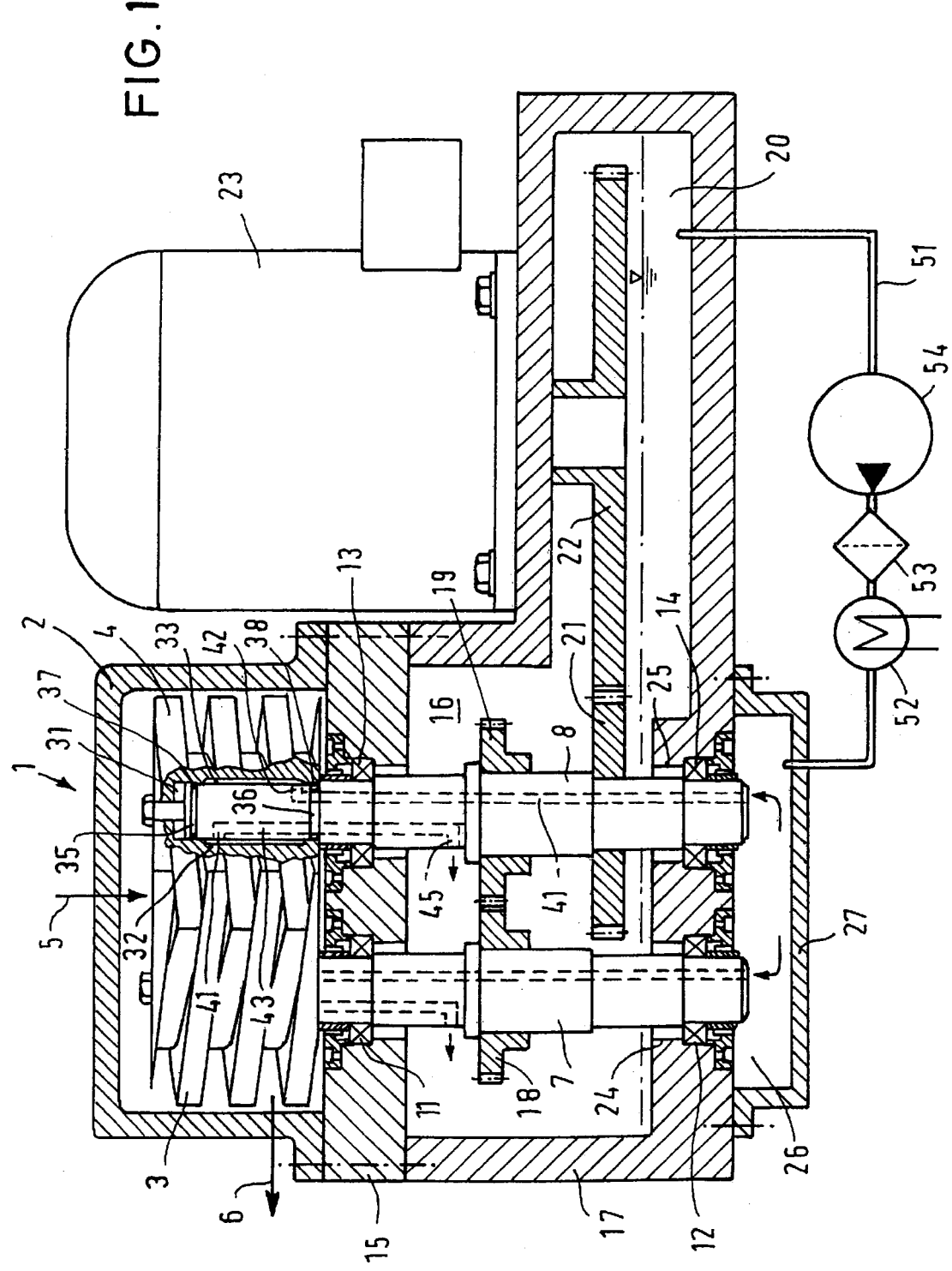
FIG. 1 is a sectional view through a screw vacuum pump with cantilevered rotors.

The screw vacuum pump 1 depicted in FIG. 1 comprises pump chamber casing 2 with the rotors 3 and 4. Inlet 5 and outlet 6 of the pump 1 are schematically marked by arrows. The rotors 3 and 4 are affixed on to the shafts 7 and 8 respectively, said shafts being each supported by a cantilevered manner by two bearings 11, 12 and 13, 14 respectively. One bearing pair 11, 13 is located in a bearing plate 15 which separates the pump chamber being free of lubricant from a gear chamber 16. Located in casing 17 of the gear chamber 16 are the synchronising toothed wheels 18, 19 affixed to the shafts 7 and 8, as well as a pair of toothed wheels 21, 22 serving the purpose of driving the pump 1, where one toothed wheel is coupled to the shaft of the drive motor 23 arranged vertically besides the pump 1. Moreover, the gear chamber has the function of an oil sump 20. The second pair of bearings 12, 14, of the shafts 7, 8 is located in bores 24, 25 said bores penetrating the bottom of the gear chamber housing 17. The shafts 7, 8 in turn penetrate through bores 24, 25 and end in an oil containing chamber 26 being formed by casing 17 and a thereto affixed trough 27.

From FIG. 1 it is apparent that the rotors 3 and 4 each have a hollow chamber 31 in which the shaft 8 extends and in which the cooling slot 32 is located. Since only rotor 4 is depicted by way of a partial section, the present embodiment is explained only with reference to this rotor 4. In the embodiment according to FIG. 1, the annular slot section 32 is located directly between shaft 8 (resp. 7) and rotor 4 (resp. 3). To this end the cylindrical inner wall of the rotor containing the hollow chamber 31 is equipped in its middle area with a section 33 turned off on a lathe, the depth of which corresponds to the thickness of the cooling slot 32. On the suction side and the delivery side, the shaft 8 rests flush against the inner wall of the hollow chamber 31. In addition, the shaft 8 is equipped in these areas with grooves 35 and 36 for sealing rings 37 and 38 which ensure a leak tight separation of the cooling slot 31 from the pump chamber.

The cooling slot 32 is supplied with the coolant through the shaft 8. It is equipped with a first bore 41 extending from the bottom end of the shaft 8 to the end of the cooling slot 32 on the delivery side. Via a cross bore 42 the bore 41 is linked to the cooling slot 32. The coolant is supplied to the cooling slot 32 through bores 41 and 42. The coolant flows through the cooling slot 32 from the delivery side to the suction side of the rotor 4. Since most of the heat which needs to be dissipated is generated on the delivery side of the rotor 4, the rotor 4 is cooled in a counterflow.

The coolant is evacuated through the second bore 43 in the shaft 8. Said bore extends from the suction side of the cooling slot 32 up to the level of the gear chamber 16. The cross bores 41, 45 provide in each instance the link between bore 43 with the cooling slot 32 respectively the gear chamber 16.

Reliable cooling of the rotors 3, 4 is attained when the coolant is capable of flowing through the relatively narrow cooling slots 32 relatively quickly and undisturbed (free of cavitation and contamination). For this reason it is expedient to ensure, besides cooling and filtering of the coolant, a sufficient pumping force. In the design example in accordance with FIG. 1, therefore, the gear chamber 16, resp. the oil sump 20 is linked to the chamber 26 through a line 51 in which there is located besides a cooler 52 and a filter 53, an oil pump 54 which may be designed by way of a gear pump, for example. The oil pump 54 ensures that the coolant enters at the necessary pressure and free of cavitation from chamber 26 into the bore 41.

Moreover, there exists the possibility of arranging oil pumps (centrifugal pumps, gear pumps) in the area of the bottom ends of the shafts 7, 8. However, these need to be so designed that they are capable of meeting the requirements as to the desired pumping properties.

Figure 2:
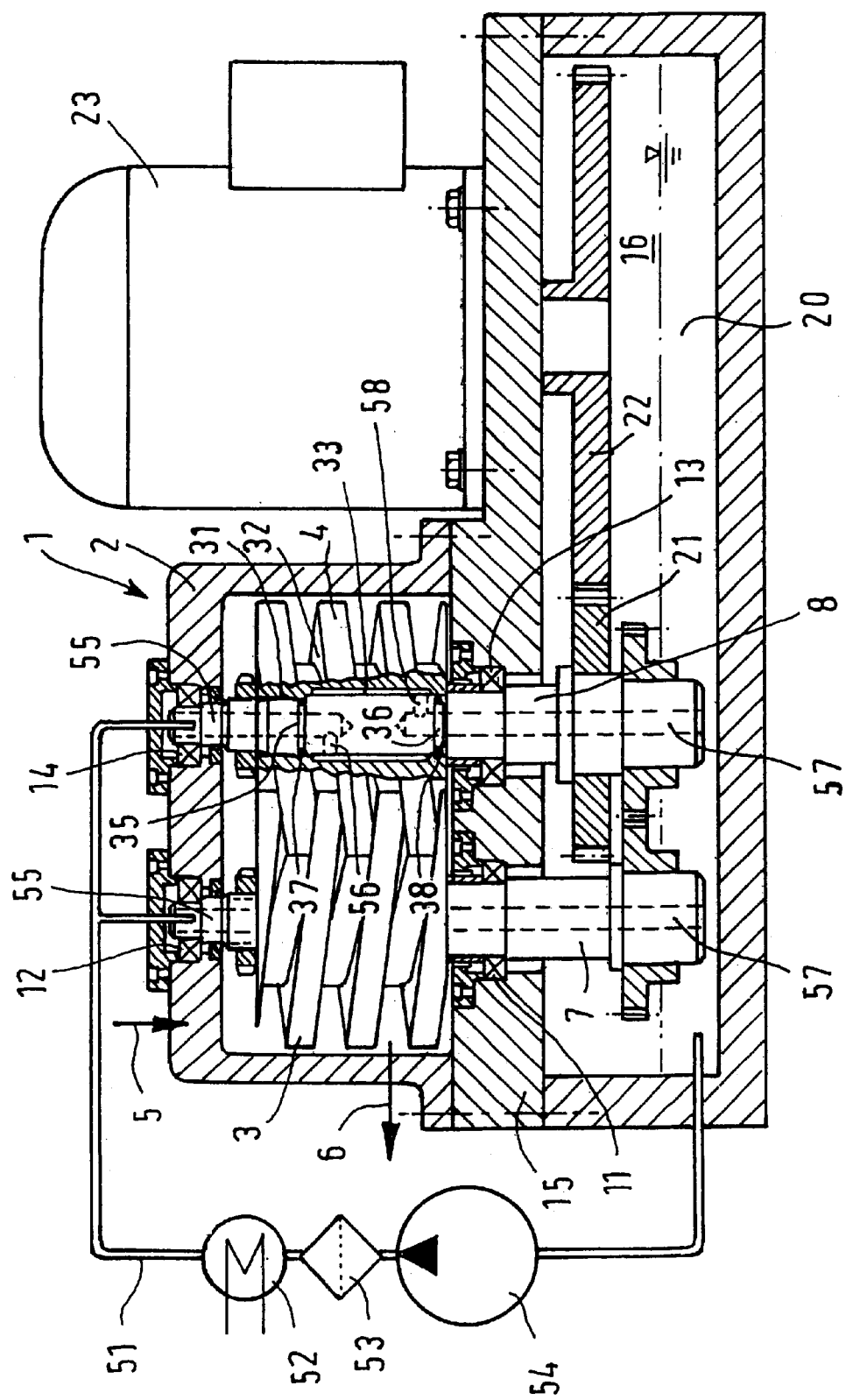
FIG. 2 is a sectional view through a screw vacuum pump with rotors having bearings at both sides.

Depicted in FIG. 2 is an embodiment in which the shafts 7, 8 of the rotors 3, 4, are supported by bearings on both sides, specifically at bearing plate 15 (bearing 11, 13) and in the pump chamber housing 2 (bearing 12, 14). The lower ends of the shafts 7, 8 end in gear chamber 16.

Owing to the fact that the shafts 7, 8 are supported by bearings at both sides, there exists the possibility of supplying the coolant on the suction side in a simple manner. To this end the shafts are equipped on the suction side with a preferably cylindrical pocket hole 55 which extends up to the end of the cooling slot 32 at the suction side.

Via a cross bore 56 the bore 55 is linked to the cooling slot 32. On the delivery side the shafts 7, 8 are equipped with a pocket hole 57 which extends up to the end of the slot 32 on the delivery side and which is linked to said slot via the cross bore 58.

For the purpose of supplying the coolant to the pocket holes 55, these are linked via line 51, said line being connected to oil sump 20 whereby the line incorporates oil pump 54, filter 53 and cooler 52. In the instance detailed, the coolant flows through the cooling slot 32 from the suction side towards the delivery side.

Figure 3:
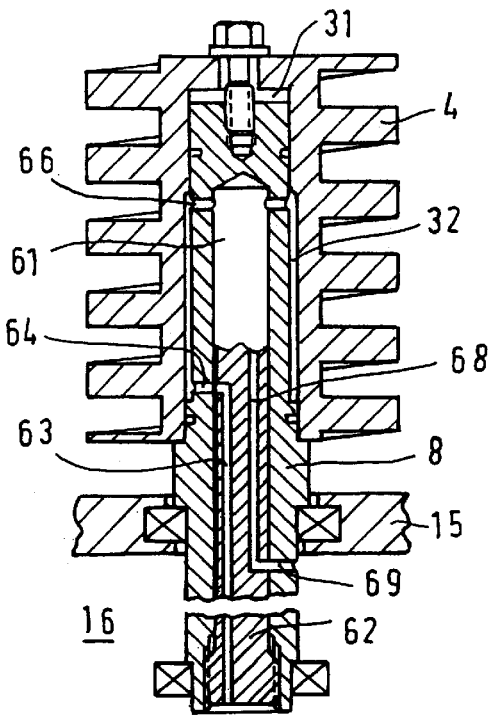
FIGS. 3, 4, and 5 are sectional views through each of two rotors of a screw vacuum pump in which the coolant is supplied to and discharged from the cooling slot by a central hollow chamber in the rotor shaft.

In the design example according to FIG. 3 in which only the rotor 4 and the shaft 8 are depicted, further means of supplying to, respectively evacuating the coolant from the cooling slot are detailed. The shaft 8 is equipped with a central pocket hole being open on the delivery side and extending over the end of the cooling slot 32 at the suction side. Said pocket hole forms a hollow chamber 61 in which a guide component 62 for the coolant is located. The guide component 62 extends from the bottom end of the shaft 8 up to and past the end of the cooling slot 32 on the delivery side. The coolant is supplied via the longitudinal bore 63 in the guide component 62, said bore being linked via truly aligned cross bores 64 through the component 62 and the shaft 8 to the end of the cooling slot 32 on the delivery side. At the level of the cooling slot 32 on the suction side, the shaft 8 is equipped with one or several cross bores 66 which open out into the chamber formed by the pocket hole 61 and the face side of the guide component 62. Said chamber is linked via the longitudinal bore 68 and the truly aligned cross bores 69 (in the guide component 62 and in the shaft 8) to the gear chamber 16 (not depicted in FIG. 3).

Figure 4:
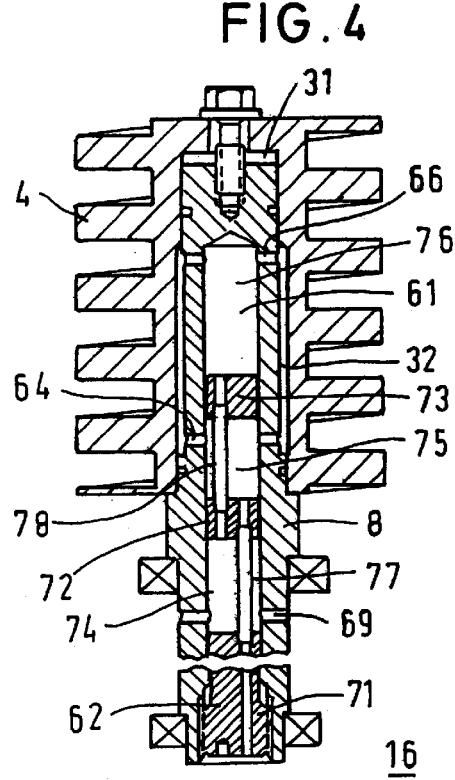

Depicted in FIG. 4 is an embodiment in which the guide component 62 comprises three sections 71, 72, 73 which divide the hollow chamber 61 in the shaft 8 in to three partial chambers 74, 75, 76 which are each located at the level of the cross bores 69, 64 and 66 respectively. Through suitable bores in the sections 71 to 73 as well as line sections 77 and 78 linking said bores, separate supply and evacuation of the coolant may be implemented. The guide component may be fitted easily, since bores which need to be truly aligned are not present. Cooling in a counterflow can be implemented in a simple manner.

Figure 5:
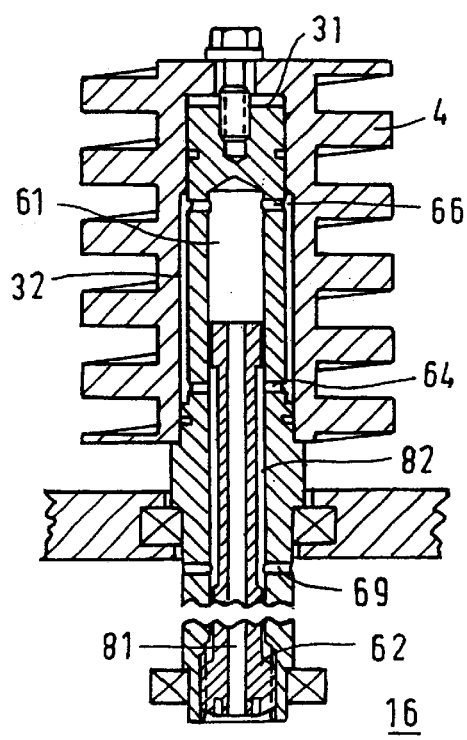

In the embodiment in accordance with FIG. 5, the coolant is supplied in contrast to the embodiments in accordance with FIGS. 3 and 4, through a central bore 81 in the guide component 62. The coolant passes into the hollow chamber 61 formed by the pocket hole as well as the guide component 62 and through the cross bore 66 into the cooling slot 32. The evacuation bores 64 are linked to lateral longitudinal grooves or an annular chamber 82 turned off on a lathe said annular chamber being located in the guide component 62. The longitudinal grooves or the annular chamber 82 extend up to the level of the gear chamber 16 where they are linked to the cross bores 69.

Figure 6:
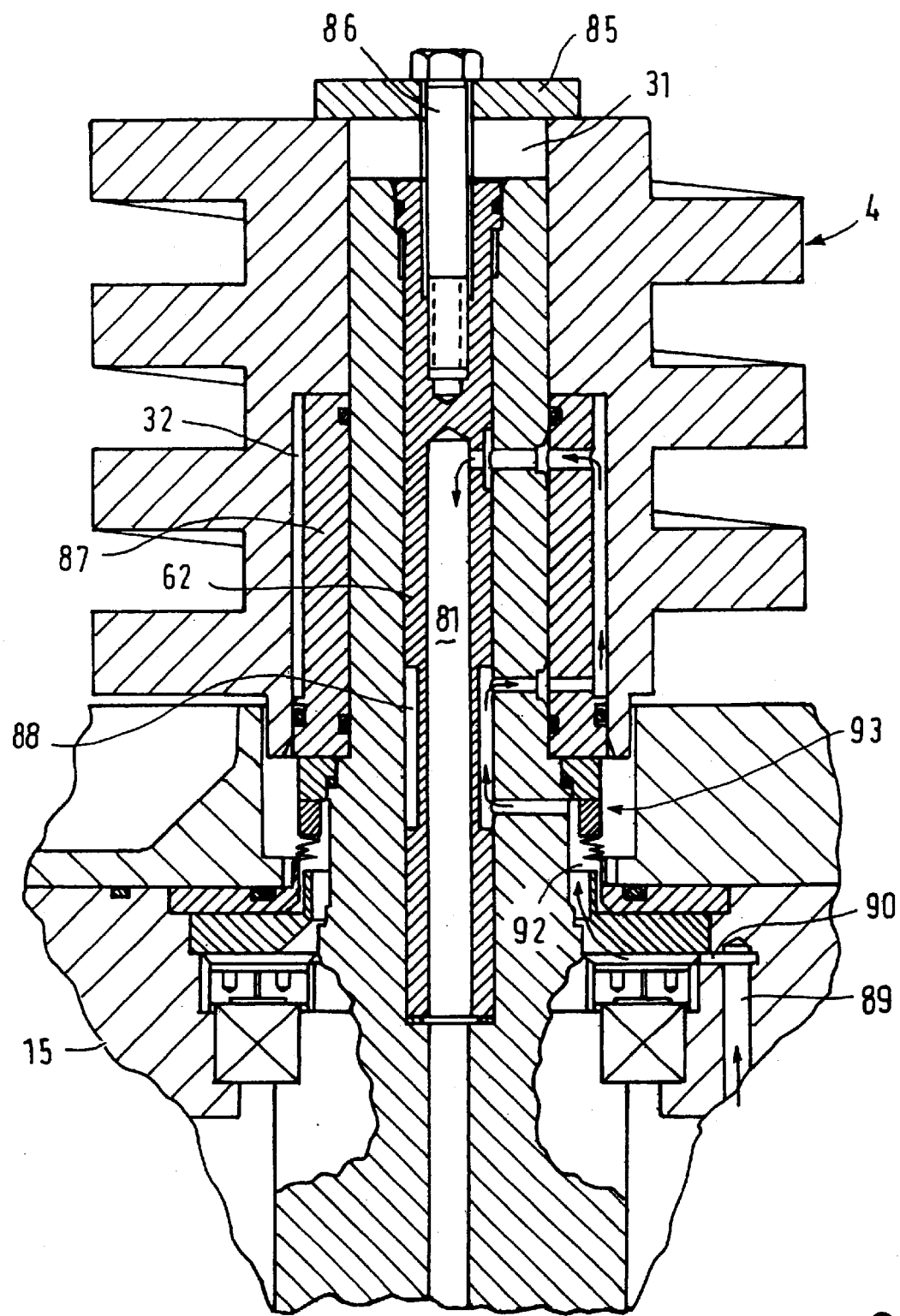
FIG. 6 is a sectional view of a rotor with a means for displacing the cooling slot to the outside.

The embodiment in accordance with FIG. 6 differs from the embodiments detailed above in that a bore is provided fully penetrating the shaft 8 and the rotor 4. For the formation of the hollow chamber 31, a cover 85 is provided on the suction side, this cover being linked via a bolt 86 with the guide component 62. The guide component 62 is firmly inserted from the suction side. Together with bolt 86 and the cover 85 it serves the purposes of axially affixing the rotor 4. The shaft 8 is equipped with an outer sleeve 87 which together with the rotor 4 forms the cooling slot 32. This slot extends substantially only at the level of the delivery side of the rotor 4. Radially displacing the cooling slot 32 towards the outside improves the cooling effect. The coolant is only supplied through a relatively short section 88 turned off on a lathe said section being located in guide component 62. Before it enters into the section 88 turned off on a lathe, it flows through bores 89, 90 in the bearing plate 15 as well as the chamber 92 on the bearing side of an axial face seal 93 where it ensures the formation of the necessary barrier pressure. The coolant is returned through the central bore 81 in the guide component 62, resp. in the shaft 8.

In the embodiment of FIGS. 7a and 7b, the shaft 8 does not extend into the rotor's hollow chamber 31. Said shaft is linked to the rotor 4 at the level of the delivery side. The guide component 62 in the rotor's hollow chamber 31 has a section 94 with an increased diameter which together with the inner wall of the rotor 4 forms the cooling slot 32. A second section 95 having, compared to the section 94 a smaller diameter, penetrates the bore 61 in the shaft 8.

For thermal reasons of permitting on the one hand the supply of the coolant from the open side of the bore 61 through a central bore 81 in the guide component 62 and on the other hand to permit cooling of the rotor 4 in a counterflow, it is required that the guide component 62 provides a crossing for the coolant flows. This is implemented through cross bores and outer groove sections in the guide component 62 which are designed as detailed in the following (see FIGS. 7a, 7b and 8): Coolant supplied centrally through the pocket hole 81 enters through a cross bore 98 into two groove sections 99 facing each other and then the coolant enters into the hollow chamber 31 (delivery side). Thereafter the coolant flows through the cooling slot 32 and enters through cross bores 66 into a line section 101 located centrally in the guide component. Said line section extends to a second cross bore 102 placed on the suction side with respect to the first cross bore 98. The two cross bores 98 and 102 are arranged approximately perpendicular to each other. The cross bore 102 opens out into groove sections 103 facing each other, which are offset by about 90 degrees with respect to groove sections 99. Thus it is possible to guide the returning coolant through these groove sections 103 to the cross bores 69 in the area of the gear chamber 16.

In the design example in accordance with FIG. 9, the rotor 4 comprises two sections 4' and 4" having differently designed threads as well as each with a hollow chamber 31' and 31" respectively. The shaft 8 extends into the hollow chamber 31" of the rotor section on the delivery side 4" and thus forms the cooling slot 32". The guide component 62 is similarly designed as in the embodiment in accordance with FIGS. 7, 8. It has a section 94 with an increased diamter which is located in hollow chamber 31' of the rotor section 4' and which forms together with the inside wall of this rotor section 4' the cooling slot 32'. A further section 95 of the guide component 62 having a smaller diameter penetrates the central bore 61 in shaft 8. The guide component 62 is equipped with a central bore 81 extending to the suction side of the rotor 4.

For simplicity and better overview, an embodiment is presented in which the coolant is supplied through the central bore 81 and where the coolant flows through lateral bores 64' in section 94 on the suction side into the cooling slot 32'. Through a section 66', 105 turned off on a lathe (or also through longitudinal grooves) as well as cross bores 64' the end of the cooling slot 32' on the delivery side is linked to the end of the cooling slot 32" on the suction side so that the coolant passes sequentially through the two cooling slots 32', 32". Through a further section 106 turned off on a lathe, the evacuation opening 66" on the delivery side of the cooling slot 32" is linked to the evacuation opening 69 at the level fo the gear chamber 16. Also in the instance of this solution there exists the possibility of also employing the guide component 62 as a tie rod, specifically for affixing the rotor section 4'.

Of course there also exists the possibility in the instance of the embodiment in accordance with FIG. 9 of designing the supply and evacuation lines for the coolant in such a manner that the cooling slots 32', 32" are supplied separately and/or in a counterflow.

The embodiments of FIGS. 7 to 9 are of particular advantage when the rotors 3, 4 are cantilevered, since then there exists the possibility of manufacturing the guide component 62 of light materials like plastic, for example. Thus the mass of the rotors far from the bearing can be kept small. The usage of plastic or similar materials also offers the general advantage that there are located between the in flowing and the outflowing coolant materials and do not conduct heat very well.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A screw vacuum pump comprising:
   two interengaging rotors, each rotor defining a central hollow chamber;
   two shafts, each shaft being received in one of the rotor central hollow chambers with a narrow, annular cooling slot segment being defined between the shaft and the rotor and extending between a suction side and a discharge side, the shafts each defining a feed line which feeds coolant oil to the annular cooling slot and a discharge line which discharges the coolant oil from the annular cooling slot;
   the annular cooling slots each having a thickness which is sufficiently thin that the boundary/flow layer of the cooling coil flowing along a shaft side surface of the annular cooling slot influences a boundary flow layer of the coolant coil flowing along a rotor side surface of the annular cooling slot in a turbulent manner.

2. The vacuum pump according to claim 1 wherein the thickness of the annular cooling slot is less than 5 mm.

3. A screw vacuum pump comprising:
   two shafts;
   two rotors secured to the shafts, each rotor having a central hollow chamber;
   coolant guiding components mounted in the hollow chamber of the rotors and rotating along with the rotor, said components forming a relatively narrow, annular slot segment having a thickness of 0.2 to 5 mm through which the coolant flows, the annular slot segment extending between the components and an inner wall of the rotor hollow chamber and between a suction side and a delivery side of the rotors, the supply of the annular slot segment with coolant being performed via separate feed and discharge lines traversing the shaft; and
   a means for ensuring a cavitation-free and bubble-free flow through the annular slot segment.

4. The pump according to claim 3, wherein the annular slot segment is cylindrical in shape.

5. A The pump according to claim 3 further including:
   a means for pumping the coolant, the means being so designed that the coolant flows at a velocity of 0.1 to 1 m/s through the slot.

6. The pump according to claim 3, wherein a direction of coolant flow is so selected that the coolant flows from the delivery side towards the suction side.

7. The pump according to claim 3, wherein the rotors are supported by bearings at both sides and the feed line for feeding the coolant includes:
   a pocket hole open to the suction side of the shafts.

8. The pump according to claim 3, wherein the discharge line for evacuating the coolant opens out into a gear chamber.

9. The pump according to claim 3, wherein at least one of the feed and discharge lines are defined by axial bores in the shaft.

10. The pump according to claim 3, wherein the feed and discharge lines are linked to the annular slot segment via radially oriented bores.

11. The pump according to claim 3, wherein each annular slot segment is located directly between the shaft and an inner wall of the rotor hollow chamber.

12. The pump according to claim 3, wherein each shaft has a sleeve whose outside limits the annular slot segment.

13. The pump according to claim 3, wherein the annular slot segment is formed by a section tuned off on a lathe, said section limiting the annular slot segment.

14. The pump according to claim 3, wherein the rotors are cantilevered and the feed line for feeding the coolant includes:
   a pocket hole open towards the delivery side of the shafts.

15. The pump according to claim 14, further including:
   a coolant pump which pumps the coolant through the delivery side ends of the shafts.

16. The pump according to claim 3, wherein the shaft has a hollow chamber and further including:
   a guide component for guiding the coolant disposed in the shaft hollow chamber.

17. The pump according to claim 16, wherein the rotor are each equipped with a through hole and each guide component functions as a tie rod for affixing the rotor to the shaft.

18. The pump according to claim 16, wherein at least one of the feed and discharge lines are defined by:
   central or non-central axial bores,
   lateral longitudinal groove sections, or
   annular slots turned off on a lathe, said annular slots being defined in the guide component.

19. The pump according to claim 18, wherein the feed and discharge lines include axial and radial line sections arranged in the guide component to permit separate crossing guidance of fed-in coolant and of evacuated coolant.

20. The pump according to claim 16, wherein an end of each shaft at the suction side is linked to an end of the rotor on the delivery side and the guide component extends into the rotor central hollow chamber, and the guide component limits the annular slot segment.

21. The pump according to claim 20, wherein the guide component is made of a light material.

22. The pump according to claim 3, wherein the rotors each have two sections, each section having an annular cooling slot segment.

23. The pump according to claim 22, wherein each shaft penetrates one rotor section on the delivery side, the other section being linked to an end of the shaft on the delivery side,
   a guide component extends into the hollow chamber of the rotor section on the suction side and limits the annular slot segment.

* * * * *